United States Patent [19]
Ji et al.

[11] Patent Number: 5,604,623
[45] Date of Patent: Feb. 18, 1997

[54] ARRAY OF THIN FILM ACTUATED MIRRORS HAVING AN IMPROVED OPTICAL EFFICIENCY AND METHOD FOR THE MANUFACTURE THEREOF

[75] Inventors: Jeong-Beom Ji; Yong-Ki Min, both of Seoul, Rep. of Korea

[73] Assignee: Daewoo Electronics Co., Ltd., Seoul, Rep. of Korea

[21] Appl. No.: 363,469

[22] Filed: Dec. 23, 1994

[30] Foreign Application Priority Data

Jan. 18, 1994 [KR] Rep. of Korea ............................ 94-801

[51] Int. Cl.$^6$ .................................................. G02B 26/08
[52] U.S. Cl. ............................ 359/224; 359/295; 359/855
[58] Field of Search ....................................... 359/196, 213, 359/214, 221, 224, 225, 226, 230, 246, 248, 290, 291, 292, 295, 323, 846, 849, 850, 855, 865, 872

[56] References Cited

U.S. PATENT DOCUMENTS

5,469,302 11/1995 Lim ............................................ 359/846
5,481,396 1/1996 Ji et al. ..................................... 359/295

Primary Examiner—Timothy P. Callahan
Assistant Examiner—Jeffrey Zweizig
Attorney, Agent, or Firm—Anderson, Kill & Olick PC

[57] ABSTRACT

An array of M×N thin film actuated mirrors for use in an optical projection system, includes an active matrix, an array of M×N actuating structures, an array of M×N mirror layers and an array of M×N supporting members. Each of the actuating structures includes a first a second and a third identically structured actuating parts, each of the actuating parts having at least a motion-inducing thin film layer, a first and a second electrodes. The first electrode from each of the actuating parts is connected to ground, thereby serving as the bias electrode, and the second electrode thereof functions as the signal electrode. Each of the mirror layers is provided with an odd number of tab portions, each of the tab portions being partially separated from the neighboring tab portions by a dividing slot therebetween. The second actuating part is secured to the middle tab portion and the first and third actuating parts, to the two next nearest tab portions, located at either side of the middle tap portion, respectively, such that when the actuating parts in each of the actuating structures deform in response to an electrical signal, the tab portions with the actuating parts attached thereto tilt while the remainder of the mirror layer stays planar, thereby allowing all thereof to reflect light beams, resulting in an increased optical efficiency.

16 Claims, 9 Drawing Sheets

ARRAY OF THIN FILM ACTUATED MIRRORS HAVING AN IMPROVED OPTICAL EFFICIENCY AND METHOD FOR THE MANUFACTURE THEREOF

FIELD OF THE INVENTION

The present invention relates to an optical projection system; and, more particularly, to an array of M×N thin film actuated mirrors for use in the system having an improved optical efficiency and method for the manufacture thereof.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

Figure 1:
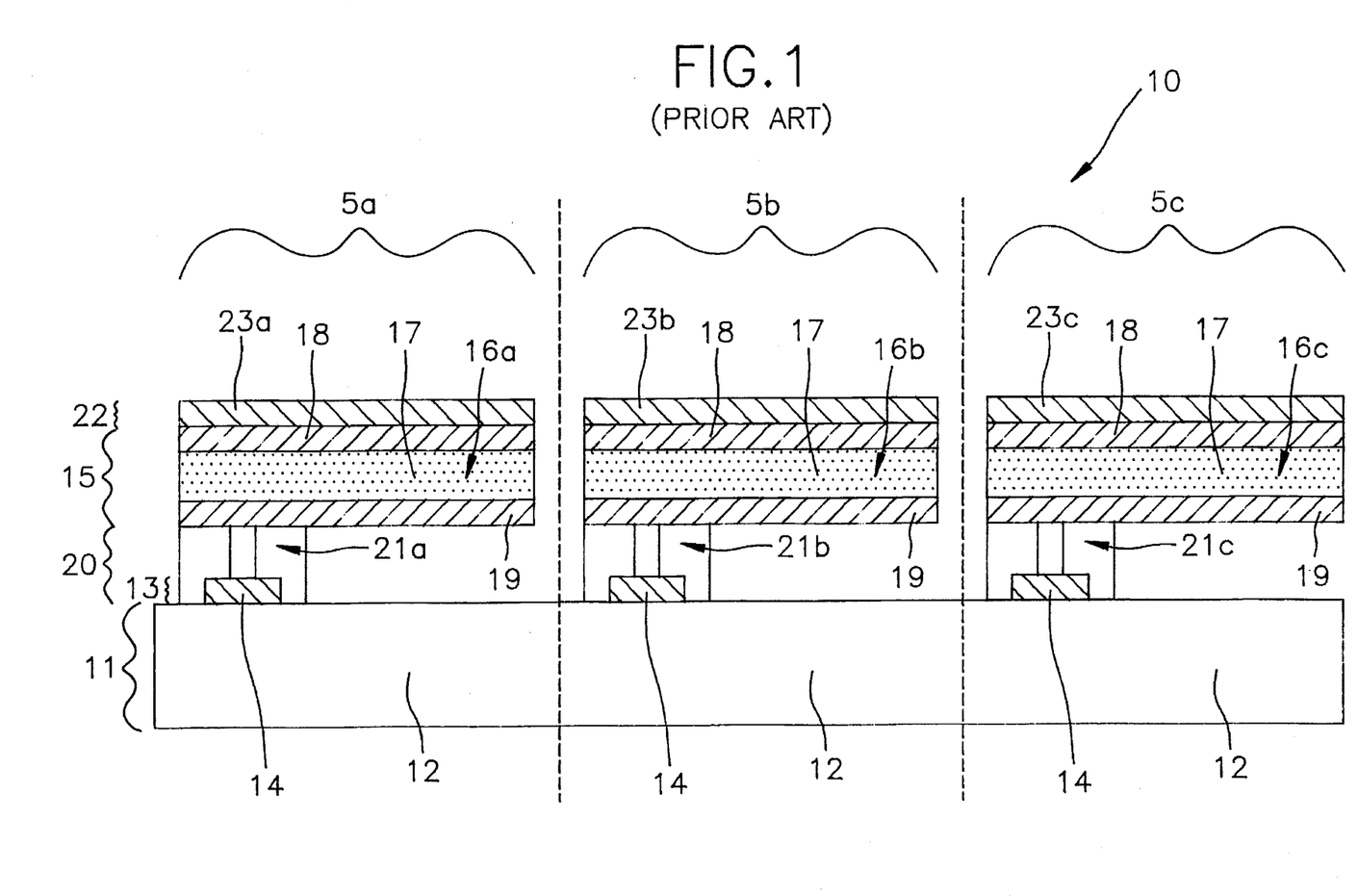
FIG. 1 shows a cross sectional view of an array of M×N thin film actuated mirrors previously disclosed.

In FIG. 1, there is shown a cross sectional view of an array 10 of M×N thin film actuated mirrors, e.g., 5a, 5b and 5c, for use in an optical projection system, disclosed in a copending commonly owned application, U.S. Ser. No. 08/331,399, entitled "THIN FILM ACTUATED MIRROR ARRAY AND METHOD FOR THE MANUFACTURE THEREOF", comprising: an active matrix 11 including a substrate 12, an array of M×N transistors (not shown) and an array 13 of M×N connecting terminals, e.g., 14a 14b and 14c; an array 15 of M×N thin film actuating structures, e.g., 16a, 16b, and 16c, each of the actuating structures 16 having at least a thin film layer 17 of a motion-inducing material, a first electrode 18 and a second electrode 19, the first and second electrodes being placed on top and bottom of the thin film motion-inducing layer 17, respectively; an array 20 of M×N supporting members, e.g., 21a, 21b and 21c, each of the supporting members, e.g., 21a, being used for holding the corresponding actuating structure 16a in place by cantilevering thereof and also for electrically connecting the corresponding actuating structure 16a and the active matrix 11; and an array 22 of M×N mirrors, e.g., 23a, 23b and 23c, for reflecting light beams, each of the mirrors being placed on top of each of the actuating strctures 16. In the thin film actuated mirror array 10, an electrical signal is applied across the thin film layer 17 of the motion-inducing material located between the pair of electrodes 18, 19 in each of the actuating structures, e.g., 16a, causing a deformation thereof, which will in turn deform the mirror 23a placed on top thereof, thereby changing the optical path of the incident light beam.

One of the major problems associated with the above described thin film actuated mirror array is the overall optical efficiency of the array 10. When each of the actuating structures, e.g., 16a deforms in response to the electric field applied across the thin film motion-inducing layer 17 thereof, the mirror 23a attached thereto also deforms. However, in the array 10, the portion of the mirror 23a secured to the supporting member 21a does not deform in respose to the electric field, but remains securely in place, and furthermore, the portion of the mirror that deforms bends to thereby create a curved top surface from which the light beams are reflected. As a result, the overall optical efficiency of the array 10 decreases, as well as, by the effective length of the mirror 23a being reduced by the length of the portion of the actuating structure secured to the supporting member 21a, but also by the curved top surface of the mirror 23a when it bends.

SUMMARY OF THE INVENTION

It is, therefore, a primary object of the present invention to provide an array of M×N actuated mirrors having an improved optical efficiency.

It is another object of the present invention to provide a method for manufacturing an array of M×N actuated mirrors.

In accordance with one aspect of the present invention, there is provided an array of M×N thin film actuated mirrors for use in an optical projection system, said array comprising:

an active matrix including a substrate, an array of M×N transistors and an array of M×N connecting terminals;

an array of M×N thin film actuating structures, each of the actuating structures including a first, a second and a third actuating parts, the first, second and third actuating parts being identically structured, each of the first, second and third actuating parts being provided with a top and a bottom surfaces, and a proximal and a distal ends, each of the first, second and third actuating parts having at least a thin film layer of a motion-inducing material including a top and a bottom surfaces, each of the first, second and third actuating parts further being provided with a first and a second electrodes with the first electrode being placed on the top surface of the motion-inducing thin film layer, and the second electrode, on the bottom surface of the motion-inducing layer, the first electrode from each of the first, second and third actuating parts in each of the actuating structures being connected to ground, thereby functioning as a bias electrode, the second electrode from each of the first, second and third actuating parts in each of the actuating structures being connected to a common signal source in the corresponding actuating part, thereby functioning as a signal electrode, wherein an electrical signal applied across the motion-inducing thin film layer between the first and second electrodes in each actuating part causes a deformation of the motion-inducing thin film layer, and hence said each actuating part; an array of M×N supporting members, each of the supporting members being used for holding each of the actuating structures in place, wherein the proximal end of each of the actuating parts in each of the actuating structures is secured to the corresponding supporting member; an array of M×N mirror layers, each of the mirror layers including a mirror for reflecting light beams and a supporting layer, each of the mirror layers being provided with an odd number, greater than or equal to five, of tab portions, each of the tab portions being partially separated from the neighboring tab portions by a dividing slot therebetween, wherein the second actuating part is located on bottom of the middle tab portion and the first and third actuating parts, on bottom of the two next nearest tab portions, located at either side of the middle tab portion, respectively, such that when the first, second and third actuating parts in each of the actuating structures deform in response to the electrical signal, the tab portions with the actuating parts attached thereto tilt while the remainder of the mirror layer, including the tab portions without the actuating parts attached thereto, stays planar, thereby allowing the remainder of the mirror layer, including the tab portions without the actuating parts attached thereto, to reflect light beams, resulting in an increased optical efficiency.

In accordance with another aspect of the present invention, there is provided a method for manufacturing an array of M×N thin film actuated mirrors for use in an optical projection system including an active matrix, an array of M×N thin film actuating structures, an array of M×N supporting members, and an array of M×N mirror layers, each of the actuating structures further including a first, a second and a third actuating parts, said method comprising the steps of: (a) providing the active matrix having a top surface, the active matrix including a substrate, an array of M×N transistors and an array of M×N connecting terminals; (b) forming a first supporting layer on the top surface of the active matrix, the supporting layer having an array of M×N pedestals corresponding to an array of M×N supporting numbers and a sacrificial area; (c) treating the sacrificial area to be removable; (d) depositing a first thin film electrode layer on the first supporting layer; (e) patterning the first thin film electrode layer into a first electrode pattern, including a signal electrode for each of the first, second and third actuating parts in each of the actuating structures; (f) providing a thin film motion-inducing layer on the supporting layer including the first electrode pattern on top thereof; (g) forming a second thin film electrode layer on the thin film motion-inducing layer; (h) patterning the second thin film electrode layer into a second electrode patten, including a bias electrode for each of the first, second and third actuating parts in each of the actuating structures; (i) depositing a second supporting layer on top of the thin film motion-inducing layer including the second electrode pattern on top thereof; (j) forming a light reflecting layer on top of the second supporting layer; (k) pattering the light reflecting layer, the second supporting layer and the motion-inducing thin film layer including the first and the second electrode patterns on top and bottom thereof, respectively; and (l) removing the sacrificial area of the first supporting layer to thereby form said array of M×N thin film actuated mirrors.

BRIEF DESCRIPTION OF THE DRAWINGS

The above and other objects and features of the present invention will become apparent from the following description of preferred embodiments given in conjunction with the accompany drawings, wherein.

DETAILED DESCRIPTION OF THE PREFERRED EMBODIMENTS

Referring now to FIGS. 2 to 6, there are provided schematic cross sectional, top and perspective views of the inventive array of M×N thin film actuated mirrors for use in an optical projection system and method for the manufacture thereof, wherein M and N are integers, in accordance with preferred embodiments of the present invention. It should be noted that like parts appearing in FIGS. 2 to 6 are represented by like reference numerals.

Figure 2:
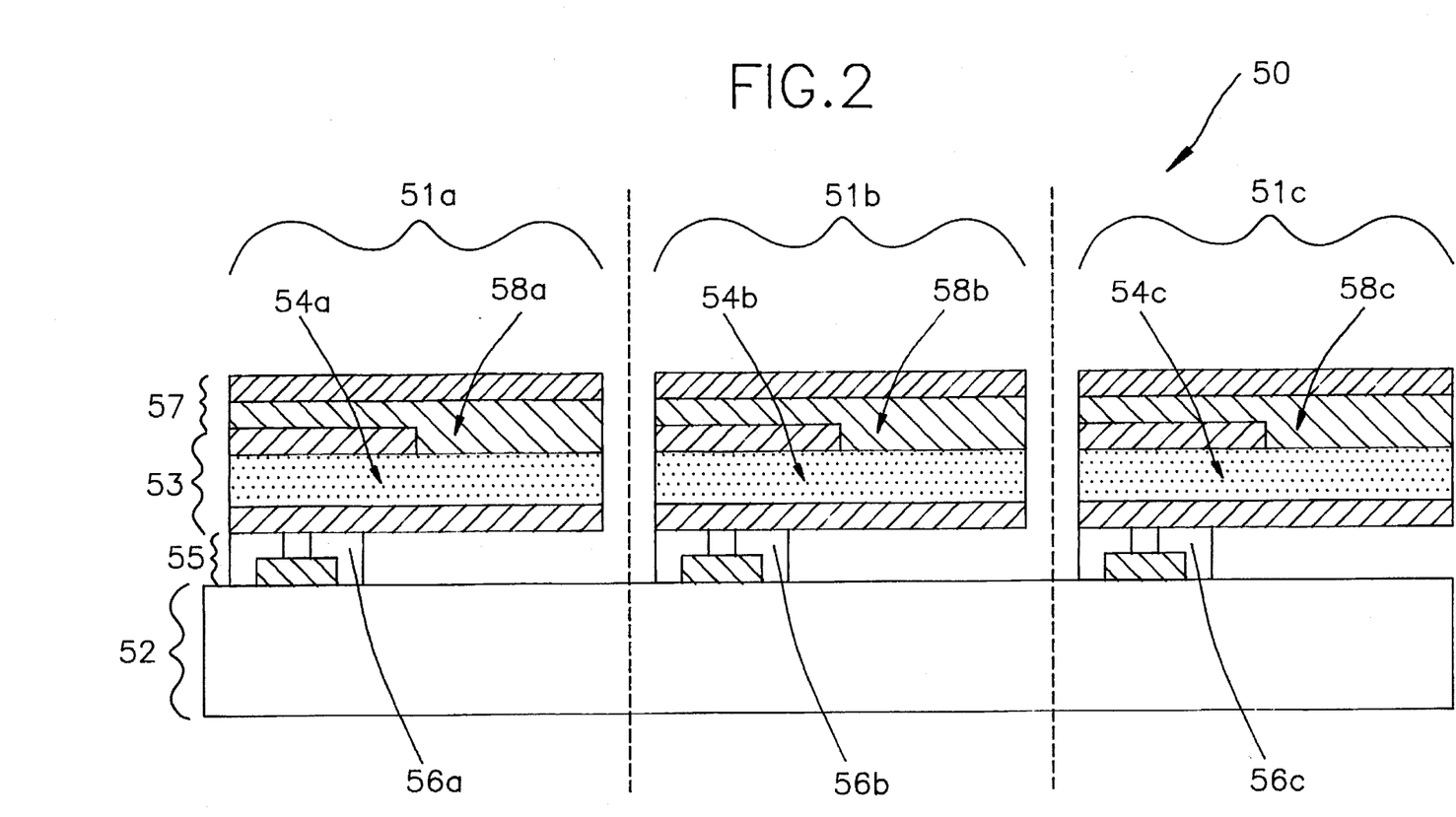
FIG. 2 represents a cross sectional view of an array of M×N thin film actuated mirrors in accordance with a preferred embodiment of the present invention.

In FIG. 2, there is illustrated a cross sectional view of a first embodiment of an array 50 of M×N thin film actuated mirrors, e.g., 51a, 51b and 51c comprising an active matrix 52, an array 53 of M×N thin film actuating structures, e.g., 54a, 54b and 54c an array 55 of M×N supporting members, e.g., 56a, 56b and 56c, and an array 57 of M×N mirror layers 58, e.g., 58a, 58b, and 58c.

Figure 3:
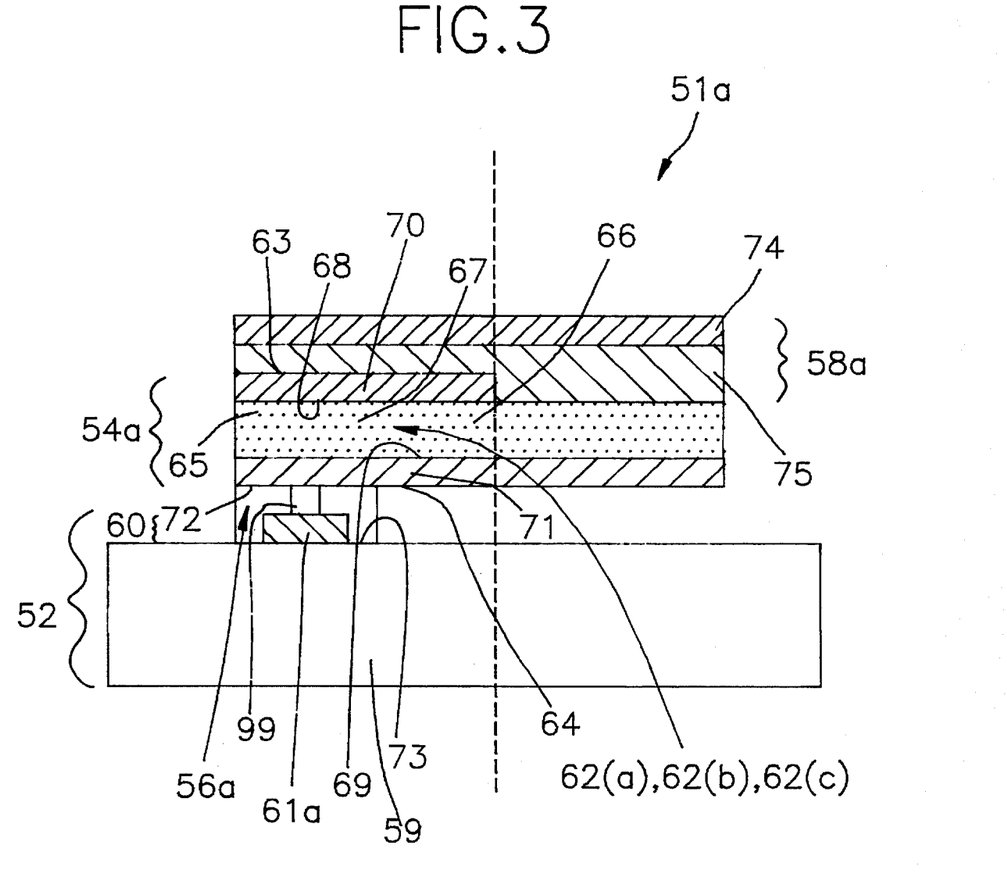
FIG. 3 illustrates a detailed cross sectional view of a thin film actuated mirror constituting the array shown in FIG. 2
Figure 6:
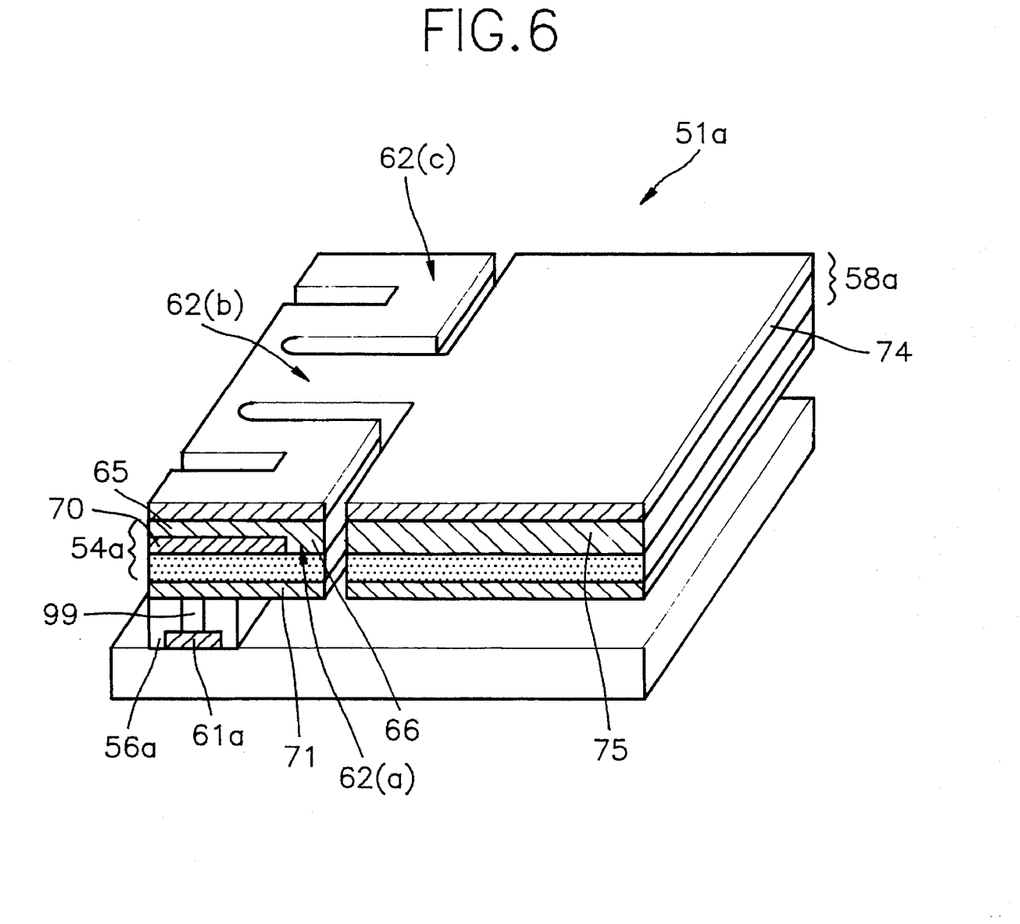
FIG. 6 is a perspective view of the thin film actuated mirror shown in FIG. 2.

FIGS. 3 and 6 represents a detailed cross sectional and a perspective views of a thin film actuated mirror, e.g., 51a, constituting the array 50, shown in FIG. 2. The active matrix 52 includes a substrate 59, an array of M×N transistors (not shown) and an array 60 of M×N connecting terminals, e.g., 61a, 61b and 61c. Each of the actuating structures, e.g., 54a, includes a first, a second and a third actuating parts 62(a), 62(b), 62(c), wherein each of the actuating parts, e.g., 62(a), is provided with a top and a bottom surfaces 63, 64, and a proximal and a distal ends 65, 66. Each of the actuating parts, e.g., 62 (a), further has at least a thin film layer 67 of a motion-inducing material, e.g., a piezoelectric material or an electrostrictive material, including a top and a bottom surfaces 68, 69 and a first and a second electrodes 70, 71 with the first electrode 70 being placed on the top surface 68 Of the motion-inducing thin film layer 67 and the second electrode 71, on the bottom surface 69 thereof. In the case when the motion-inducing thin film layer 67 is made of a piezoelectric material, e.g., lead zirconium titanate(PZT), it must be poled. The first electrode 70 from each of the first, second and third actuating parts 62(a), 62(b), 62(c) is connected to ground, thereby functioning as a bias electrode, and the second electrode 71 therefrom functions as a signal electrode. The first and second electrodes 70, 71 are made of metals such as platinum(Pt) or platinum/tantalum(Pt/Ta).

An electrical signal applied across the motion-inducing thin film layer 67 between the first and second electrodes 70, 71 in each of the actuating parts 62(a), 62(b), 62(c) causes a deformation of the motion-inducing thin film layer 67 therebetween, and hence the actuating parts 62(a), 62(b), 62(c).

Each of the M×N supporting members, e.g., 56a, provided with a top and a bottom surfaces 72, 73, is used for holding each of the actuating parts 62(a), 62(b), 62(c) of each of the actuating structures 54 in place and also for electrically connecting the second electrode 71 in the first, second and third actuating parts 62(a), 62(b), 62(c) in each of the actuating structures 54 with the corresponding connecting terminal 61a on the active matrix 52 by being provided with a conduit 99, made of a metal, e.g., tungsten (W) or titanium (Ti). In the inventive array 50, each of the first, second and third actuating parts 62(a), 62(b), 62(c) in each of the actuating structures, e.g., 54a is cantilevered from the corresponding supporting member 56a by being mounted on the top surface 72 of the corresponding supporting member 56a at the bottom surface 64 of each of the first, second and third actuating parts 62(a), 62(b), 62(c) in each of the actuating structures, e.g., 54a, at the proximal end 65 thereof, and the bottom surface 73 of each of the supporting members 56a is placed on top of the active matrix. The supporting members, e.g., 56a, 56b and 56c, are made of a ceramic.

Figure 4:
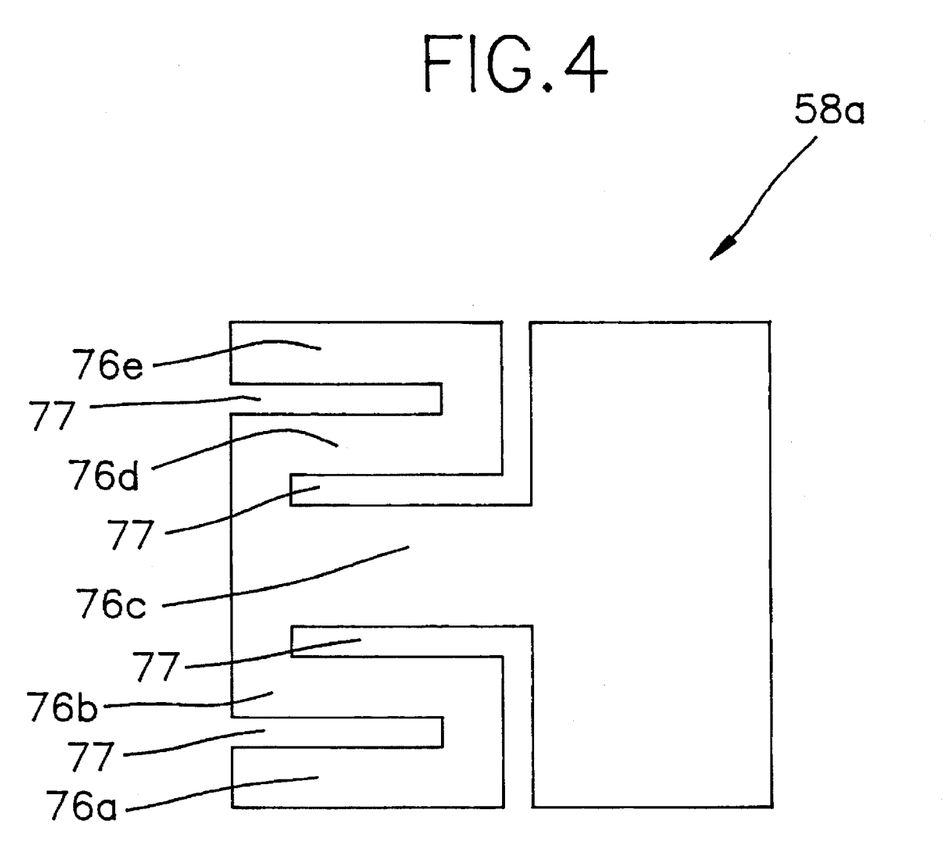
FIG. 4 depicts a top view of a thin film actuated mirror from the array shown in FIG. 3.

Each of the mirror layers, e.g., 58a, includes a mirror 74 for reflecting light beams and a supporting layer 75. Furthermore, each of the mirror layers, e.g., 58a, is provided with an odd number, equal to or greater than five, of tab portions, e.g., 76a, 76b, 76c, 76d and 76e, each of the tab portions being partially separated from the neighboring tab portions by a dividing slot 77 therebetween, as illustrated in FIGS. 4 and 6. In the embodiment shown in FIGS. 4 and 6, there are five tab portions, e.g., 76a, 76b, 76c, 76d and 76e, in each of the mirror layers, e.g., 58a.

In each of the thin film actuated mirrors 51, the second actuating part 62(b) is located on bottom of the middle tab portion, and the first and third actuating parts 62(a), 62(c), on bottom of the two next nearest tab portions located at either side of the middle tab portion, respectively, such that when the first, second and third actuating parts 62(a), 62(b), 62(c) in each of the actuating structures, e.g., 54a, deform in response to the electrical signal, the tab portions with the actuating parts attached thereto tilt while the remainder of the corresponding mirror layer 58a, including the tab portions without the actuating parts attached thereto, stays planar, and as a result, the effective length of the mirror layer 58a becomes the entire length thereof, resulting in a net increase in optical efficiency over the array 10 disclosed previously.

Figure 5A:
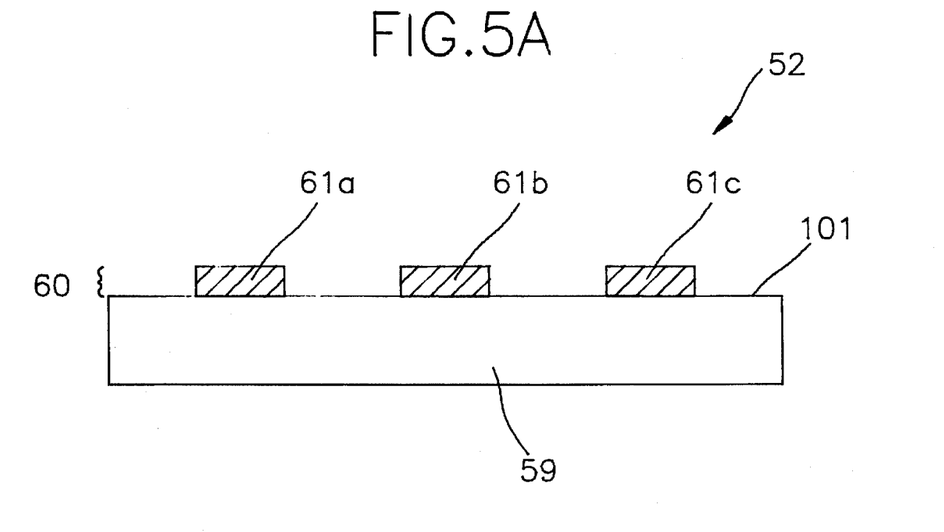
FIGS. 5A to 5F reproduce schematic cross sectional views setting forth the manufacturing steps for the first embodiment in accordance with the present invention.

There are illustrated in FIGS. 5A to 5F the manufacturing steps involved in manufacturing of the first embodiment of the present invention. The process for manufacturing the first embodiment, i.e., the array 50 of M×N thin film actuated mirrors, e.g., 51a, 51b and 51c, begins with the preparation of the active matrix 52 having a top surface 101, comprising the substrate 59, the array of M×N transistors (not shown) and the array 60 of M×N connecting terminals, e.g., 61a, 61b and 61c, as shown in FIG. 5A.

Figure 5B:
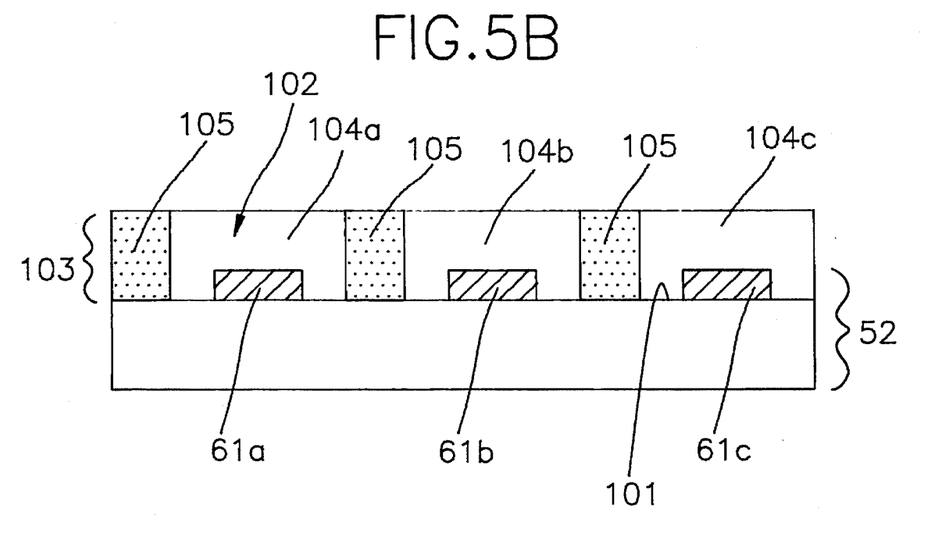

In the subsequent step, there is formed on the top surface 101 of the active matrix 52 a first supporting layer 102, including an array 103 of M×N pedestals, e.g., 104a, 104b and 104c, corresponding to the array 55 of M×N supporting members, e.g., 56a and 56b, and a sacrificial area 105 surrounding thereof, wherein the first supporting layer 102 is formed by: depositing a sacrificial layer (not shown) on the entirety of the top surface 101 of the active matrix 52; forming an array of M×N empty slots(not shown) to thereby generate the sacrificial area 105, each of the empty slots being located around each of the M×N connecting terminals 61; and providing a pedestal, e.g., 104a in each of the empty slots, as shown in FIG. 5B. The sacrificial layer is formed, e.g., by using a chemical vapor deposition(CVD) method, the array of empty slots, e.g., using a sputtering method or a CVD method, followed by an etching method. The sacrificial area 105 of the first supporting layer 102 is then treated as to be removable later by using an etching method or by applying appropriate chemicals.

Figure 5C:
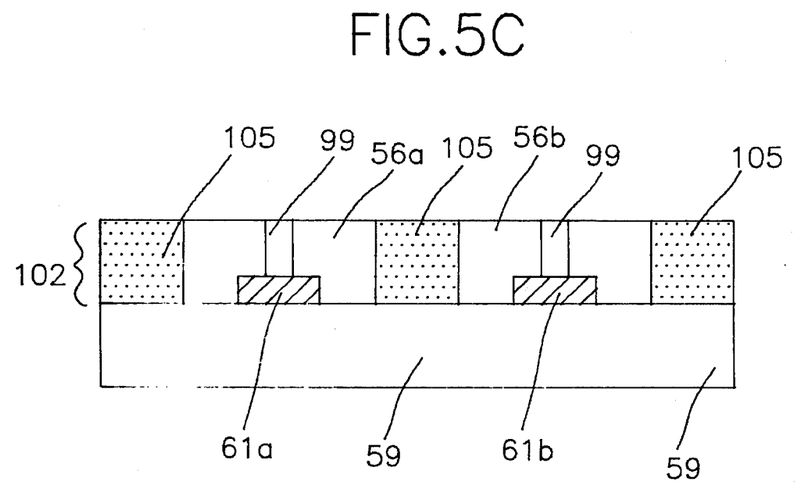

The conduit 99 for electrically connecting the second electrode 71 in each of the actuating parts 62(a), 62(b), 62(c) in each of the actuating structures with the corresponding connecting terminal 61, made of a metal, e.g., tungsten(W) or titanium(Ti), is formed in each of the pedestals 104 by first creating a hole extending from top thereof to top of the respective connecting terminal using an etching method, followed by filling therein with a metal, e.g., W, as depicted in FIG. 5C.

Figure 5D:
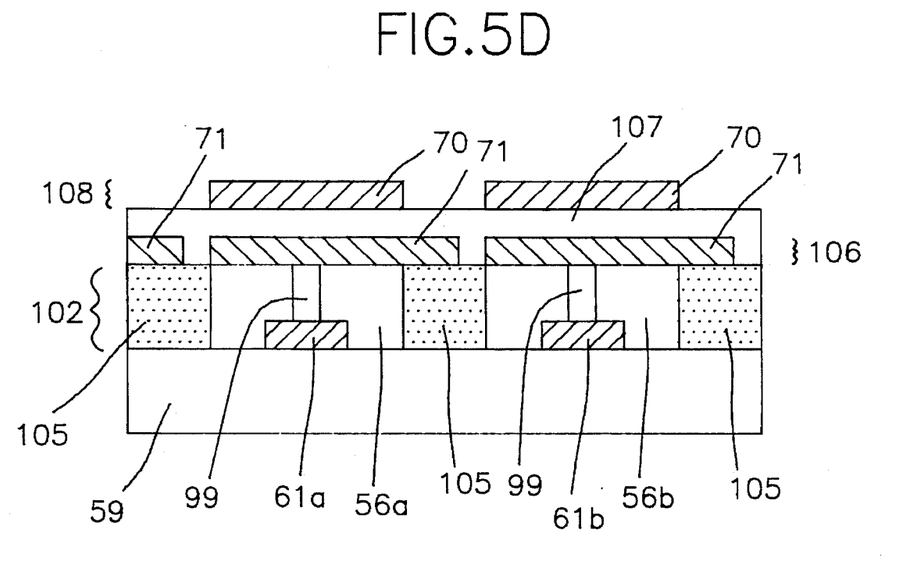

Subsequently, as depicted in FIG. 5D, a first thin film electrode layer 106, made of an electrically conducting material, e.g., Pt, is deposited on the first supporting layer 102. Thereafter, the first thin film electrode layer (not shown) is patterned into a first electrode pattern 106, including the second electrode 71 for each of the first, second and third actuating parts 62(a), 62(b), 62(c) in each of the actuating structures. In the subsequent step, a thin film layer 107 of a motion-inducing material, e.g., PZT, and a second thin film electrode layer (not shown), made of an electrically conducting material, e.g., Ag, are successively formed on top of the first supporting layer 102 including the first electrode pattern 106, as shown in FIG. 5D. The first and second thin film electrode layers are formed using a sputtering method, and the motion-inducing thin film layer, using one of a sputtering method or CVD method or a sol-gel method. Thereafter, the second thin film electrode layer is patterned into a second electrode pattern 108, including the first electrode 70 for each of the first, second and third actuating parts 62(a), 62(b), 62(c) in each of the actuating structures 54.

Figure 5E:
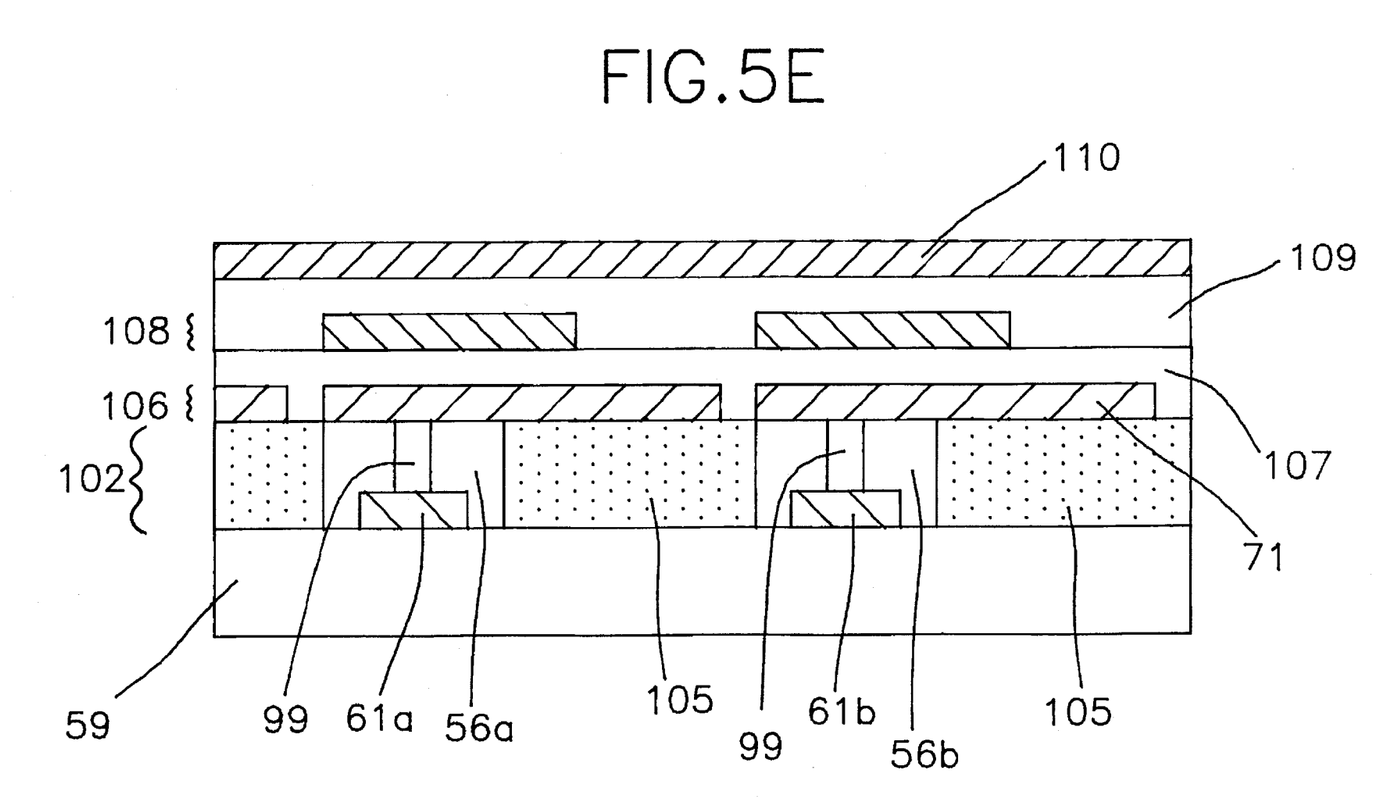

As illustrated in FIG. 5E, a second supporting layer 109, a made of a ceramic, is deposited on top of the motion-inducing thin film layer 107 including the second electrode pattern on top thereof. Subsequently, a light reflecting layer 110 is formed on top of the second supporting layer 109 using a sputtering method.

Figure 5F:
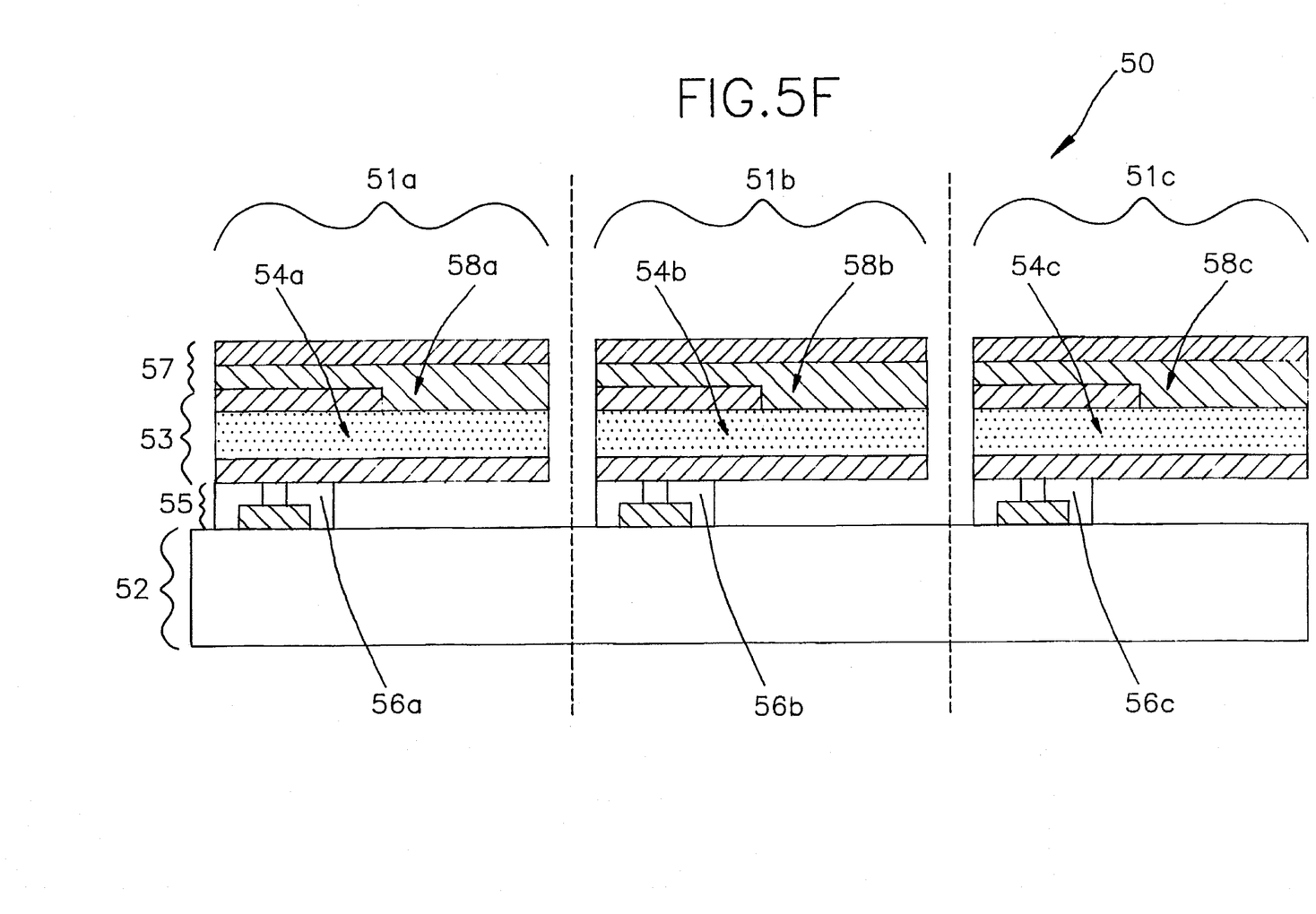

Thereafter, as depicted in FIG. 5F, the light reflecting layer 110, the second supporting layer 109 and the motion-inducing thin film layer 107, including the first and second electrode patterns on top and bottom thereof, respectively, are patterned, and the sacrificial area 105 of the first supporting layer 102 is removed to thereby form the array 50 of M×N thin film actuated mirrors,e.g., 51a, 51b and 51c.

As stated earlier, the thin film layers of the electrically conducting, the motion inducing, and the light reflecting materials are deposited and patterned with the known thin film techniques, such as sputtering, sol-gel, evaporation, etching and micro-machining.

While the present invention has been described with respect to certain preferred embodiments only, other modifications and variations may be made without departing from the scope of the Present invention as set forth in the following claims.

What is claimed is:

1. An array of M×N thin film actuated mirrors, wherein M and N are integers, for use in an optical projection system, said array comprising:

an active matrix including a substrate, an array of M×N transistors and an array of M×N connecting terminals;

an array of M×N thin film actuating structures, each of the actuating structures including a first, a second and a third actuating parts, the first, second and third actuating parts being identically structured, each of the first, second and third actuating parts being provided with a top and a bottom surfaces, and a proximal and a distal ends, each of the first, second and third actuating parts having at least a thin film layer of a motion-inducing material including a top and a bottom surfaces, each of the first, second and third actuating parts further being provided with a first and a second electrodes with the first electrode being placed on the top surface of the motion-inducing thin film layer, and the second electrode, on the bottom surface of the motion-inducing layer, the first electrode from each of the first, second and third actuating parts in each of the actuating structures being connected to ground, thereby functioning as a bias electrode, the second electrode from each of the first, second and third actuating parts in each of the actuating structures being connected to a common signal source in the corresponding actuating part, thereby functioning as a signal electrode, wherein an electrical signal applied across the motion-inducing thin film layer between the first and second electrodes in each actuating part causes a deformation of the motion-inducing thin film layer, and hence said each actuating part;

an array of M×N supporting members, each of the supporting members being used for holding each of the actuating structures in place, wherein the proximal end of each of the actuating parts in each of the actuating structures is secured to the corresponding supporting member;

an array of M×N mirror layers, each of the mirror layers including a mirror for reflecting light beams and a supporting layer, each of the mirror layers being provided with an odd number, greater than or equal to five, of tab portions, each of the tab portions being partially separated from the neighboring tab portions by a dividing slot therebetween, wherein the second actuating part is located on bottom of the middle tab portion and the first and third actuating parts, on bottom of the two next nearest tab portions located at either side of the middle tab portion, respectively, such that when the first, second and third actuating parts in each of the actuating structures deform in response to the electrical signal, the tab portions with the actuating parts attached thereto tilt while the remainder of the mirror layer, including the tab portions without the actuating parts attached thereto, stays planar, thereby allowing the remainder of the mirror layer, including the tab portions without the actuating parts attached thereto, to reflect light beams, resulting in an increased optical efficiency.

2. The thin film actuated mirror array of claim 1, wherein each of the supporting members is made of a ceramic.

3. The thin film actuated mirror array of claim 2, wherein each of the supporting members is provided with a conduit for electrically connecting the second electrode in each of the actuating parts in each of the actuating structures with the corresponding connecting terminal on the active matrix.

4. The thin film actuated mirror array of claim 3, wherein the conduit is made of tungsten or titanium.

5. The thin film actuated mirror array of claim 1, wherein each of the supporting layers is made of a ceramic.

6. The thin film actuated mirror array of claim 1, wherein the motion-inducing thin film layer is made of an electrictive or a piezoelectric material.

7. A method for manufacturing an array of M×N thin film actuated mirrors for use in an optical projection system including an active matrix, an array of M×N thin film actuating structures, an array of M×N supporting members, and an array of M×N mirror layers, each of the actuating structures further including a first, a second and a third actuating parts, said method comprising the steps of:

(a) providing the active matrix having a top surface, the active matrix including a substrate, an array of M×N transistors and an array of M×N connecting terminals;

(b) forming a first supporting layer on the top surface of the active matrix, the supporting layer having an array of M×N pedestals corresponding to an array of M×N supporting numbers and a sacrificial area;

(c) treating the sacrificial area to be removable;

(d) depositing a first thin film electrode layer on the first supporting layer;

(e) patterning the first thin film electrode layer into a first electrode pattern, including a signal electrode for each of the first, second and third actuating parts in each of the actuating structure;

(f) providing a thin film motion-inducing layer on the supporting layer including the first electrode pattern on top thereof;

(g) forming a second thin film electrode layer on the thin film motion-inducing layer;

(h) patterning the second thin film electrode layer into a second electrode patten, including a bias electrode for each of the first, second and third actuating parts in each of the actuating structures;

(i) depositing a second supporting layer on top of the thin film motion-inducing layer including the second electrode pattern on top thereof;

(j) forming a light reflecting layer on top of the second supporting layer;

(k) pattering the light reflecting layer, the second supporting layer and the motion-inducing thin film layer including the first and the second electrode patterns on top and bottom thereof, respectively; and (l) removing the sacrificial area of the first supporting layer to thereby form said array of M×N thin film actuated mirrors.

8. The method of claim 7, wherein the first and second thin film electrode layers are formed using a sputtering method.

9. The method of claim 7, wherein the motion-inducing thin film layer is formed by using a sputtering method, a chemical vapor deposition method, or a sol-gel method.

10. The method of claim 7, wherein the light reflecting layer is formed using a sputtering method.

11. The method of claim 7, wherein the first and second electrode patterns are obtained using an etching method.

12. The method of claim 7, wherein the first supporting layer is formed by:

(a) depositing a first sacrificial layer on the top surface of the active matrix;

(b) providing an array of M×N first empty slots on the sacrificial layer, each of the first empty slots being located around each of the M×N connecting terminals; and (c) forming a pedestal in each of the first empty slots.

13. The method of claim 12, wherein the first sacrificial layer is formed using a sputtering method.

14. The method of claim 12, wherein the array of M×N first empty slots is formed using an etching method.

15. The method of claim 12, wherein the pedestals are formed using a sputtering method, followed by an etching method.

16. The method of claim 12, wherein the pedestals are formed using a chemical vapor deposition method, followed by an etching method.

* * * * *